(12) United States Patent
Park (10) Patent No.: US 11,006,710 B1
(45) Date of Patent: May 18, 2021

(54) COMBINED SHADE AND BACKPACK

(71) Applicant: Sungho Park, Seoul (KR)

(72) Inventor: Sungho Park, Seoul (KR)

(*) Notice: Subject to any disclaimer, the term of this patent is extended or adjusted under 35 U.S.C. 154(b) by 0 days.

(21) Appl. No.: 16/642,119

(22) PCT Filed: Dec. 9, 2019

(86) PCT No.: PCT/KR2019/017292
§ 371 (c)(1),
(2) Date: Feb. 26, 2020

(87) PCT Pub. No.: WO2020/122527
PCT Pub. Date: Jun. 18, 2020

(30) Foreign Application Priority Data

Dec. 10, 2018 (KR) .................. 10-2018-0157842

(51) Int. Cl.
| | |
|---|---|
| *A45B 11/02* | (2006.01) |
| *A45F 3/08* | (2006.01) |
| *A45B 23/00* | (2006.01) |
| *A45F 3/10* | (2006.01) |
| *A45F 3/00* | (2006.01) |
| *A45F 3/12* | (2006.01) |

(52) U.S. Cl.
CPC .............. *A45B 11/02* (2013.01); *A45B 23/00* (2013.01); *A45F 3/08* (2013.01); *A45F 3/10* (2013.01); *A45B 2023/0093* (2013.01); *A45B 2200/1036* (2013.01); *A45F 2003/003* (2013.01); *A45F 2003/122* (2013.01)

(58) Field of Classification Search
CPC ............ A45B 11/02; A45B 2200/1036; A45B 2023/0093; A45F 2003/003; A45F 2003/122; A45F 3/08; A45F 3/10

USPC .......................... 224/186–190; 135/16, 143
See application file for complete search history.

(56) References Cited

U.S. PATENT DOCUMENTS

| | | | | |
|---|---|---|---|---|
| 229,465 | A * | 6/1880 | Ray ....................... | A42B 3/322 2/410 |
| 578,572 | A * | 3/1897 | Lashells ................. | A45B 11/02 224/189 |
| 3,404,915 | A * | 10/1968 | De Souza Filho ...... | A47C 4/52 297/17 |

(Continued)

FOREIGN PATENT DOCUMENTS

| | | |
|---|---|---|
| JP | 2018-164597 A | 10/2018 |
| KR | 10-2005-0102891 A | 10/2002 |

(Continued)

*Primary Examiner* — Justin M Larson
(74) *Attorney, Agent, or Firm* — KORUS Patent, LLC; Seong Il Jeong (57) ABSTRACT

Disclosed is a combined shade and backpack. The combined shade and backpack includes: a backpack frame configured to come into contact with and be supported on the back part of a user, and adapted such that an accommodation part is fastened thereto; a shade body part including a fixed frame detachably disposed on the upper side of the backpack frame, a folding frame foldably disposed on the fixed frame, and a shade frame disposed to be inclined to the folding frame; stopper members configured to fix a rotated state of the folding frame; a shade cover configured to cover spaces among the fixed frame, the folding frame, and the shade frame; and a rotating fan disposed on the shape frame, and configured to provide forced air blowing to the head part of the user.

7 Claims, 6 Drawing Sheets

(56) References Cited

U.S. PATENT DOCUMENTS

| | | | | |
|---|---|---|---|---|
| 4,112,957 A * | 9/1978 | Biven | ............... | A45B 11/00 135/87 |
| 4,170,242 A * | 10/1979 | Caso | ............... | A45B 11/02 135/146 |
| 4,179,053 A * | 12/1979 | Figura | ............... | A45F 3/08 135/120.3 |
| 5,096,257 A * | 3/1992 | Clark | ............... | A47C 1/143 297/184.15 |
| 5,653,248 A * | 8/1997 | Ness | ............... | B60N 2/286 135/151 |
| 5,695,100 A * | 12/1997 | O'Brien | ............... | A47C 7/66 224/160 |
| 5,896,590 A * | 4/1999 | Fleisch | ............... | A42B 3/322 2/455 |
| 6,024,264 A * | 2/2000 | Java | ............... | A45B 3/00 135/16 |
| 6,076,539 A * | 6/2000 | Richardson | ............... | A45B 11/00 135/120.3 |
| 8,448,728 B2 * | 5/2013 | Schneider | ............... | A61G 5/10 180/2.2 |
| 8,690,031 B1 * | 4/2014 | Blakley | ............... | A45F 4/12 224/190 |
| 8,727,190 B2 * | 5/2014 | Blair | ............... | A45F 3/06 224/153 |
| 8,851,343 B1 * | 10/2014 | Evans | ............... | A45B 11/02 224/190 |
| 8,944,300 B1 * | 2/2015 | Kaufman | ............... | A45B 11/02 224/190 |
| 9,745,772 B2 * | 8/2017 | Chen | ............... | A45B 11/00 |
| 9,814,287 B1 * | 11/2017 | Perez Vazquez | ............... | A45B 11/00 |
| 10,251,467 B2 * | 4/2019 | Donhauser | ............... | A45F 3/08 |
| 10,561,225 B2 * | 2/2020 | Parekh | ............... | A45F 3/047 |
| 10,893,729 B2 * | 1/2021 | Farese | ............... | A45B 25/24 |
| 2006/0054207 A1 * | 3/2006 | Wootliff | ............... | A47C 7/66 135/96 |
| 2007/0262103 A1 * | 11/2007 | Blakley | ............... | A45B 11/02 224/190 |
| 2013/0098410 A1 * | 4/2013 | Prasannakumar | ............... | A45B 19/02 135/16 |
| 2015/0296938 A1 * | 10/2015 | Armina del Valle | ............... | A45B 11/02 135/161 |
| 2020/0222274 A1 * | 7/2020 | Zhijian | ............... | A45C 13/001 |

FOREIGN PATENT DOCUMENTS

| KR | 20-0434624 Y1 | 12/2006 |
|---|---|---|
| KR | 10-2016-0062398 A | 6/2016 |

* cited by examiner

COMBINED SHADE AND BACKPACK

TECHNICAL FIELD

The present invention relates to a combined shade and backpack that is capable of shading sunlight.

BACKGROUND ART

In general, travel backpacks have a volume and size that allow carrying, unlike bulky or heavy bags, and are equipped with straps that can be worn on the shoulder or the back.

Backpacks are intended to carry various items needed by a user when hiking, traveling a long distance, or taking a light trip such as taking a walk in a park.

Among the items carried in these backpacks, there are an umbrella, a parasol, and a raincoat.

An umbrella and a raincoat are intended to prepare for fall, such as rain or snow, during the trip, and a parasol is intended to prevent glare from strong sunlight in summer or daytime, or to reduce travel fatigue caused by strong light.

However, when an umbrella, a parasol, or a raincoat is carried in a backpack, problems arise in that the volume and weight of the backpack are increased, the hand is not free because the umbrella or parasol is supported with one hand, and a large amount of power is consumed to support the umbrella or parasol with the hand when wind blows.

(Patent Document 1) Korean Patent Application Publication No. 10-2015-0102891

DISCLOSURE

Technical Problem

An embodiment of the present invention provides a combined shade and backpack including: a backpack frame configured to come into contact with and be supported on the back part of a user, and adapted such that an accommodation part is fastened thereto; a shade body part including a fixed frame detachably disposed on the upper side of the backpack frame, a folding frame foldably disposed on the fixed frame, and a shade frame disposed to be inclined to the folding frame; stopper members configured to fix a rotated state of the folding frame; a shade cover configured to cover spaces among the fixed frame, the folding frame, and the shade frame; and a rotating fan disposed on the shape frame, and configured to provide forced air blowing to the head part of the user.

The backpack frame may include: a frame body configured to be supported on the back part of the user; and reception parts disposed on the frame body, and configured to detachably receive the fixed frame.

The combined shade and backpack may further include a battery member disposed on the folding frame and configured to provide rotation driving force to the rotating fan.

The combined shade and backpack may further include auxiliary accommodation parts configured to be detachably attached to the backpack frame.

Fastening protrusions may protrude from the side surfaces of the fixed frame and the folding frame, respectively.

The stopper members may be fastening pieces in which fastening holes configured to receive the fastening protrusions are formed in both sides of the fastening pieces in the state in which the folding frame is rotated to the fixed frame.

Extension covers configured to extend to side surfaces of the shade cover may be formed on the side surfaces of the folding frame.

The first sides of edges of the extension covers may be detachably fastened to the shade cover attached to the fixed frame by fastening members.

Technical Solution

An embodiment of the present invention is intended to provide a combined shade and backpack that enables the appropriate shading of sunlight in an environment in which a face is exposed to sunlight.

Advantageous Effects

According to the embodiment of the present invention, the shade part is rotated to the location of the head of a user in the state in which a backpack is in use, thereby enabling the shading of sunlight to be performed. Additionally, cooling air may be supplied to the head part of a user in response to the operation of the rotating fan, thereby enabling the degree of satisfaction of a user to be improved due to comfortable use.

MODE FOR INVENTION

The terms or words used in the present specification and the claims should not be interpreted as being limited to common or dictionary meanings, but should be interpreted as having meanings and concepts suitable for the technical spirit of the invention based on the principle that an inventor may appropriately define the concepts of terms in order to describe his or her invention in the best way.

Throughout the specification, when any portion is described "including" any component, it means that it further includes another component, rather than excluding another component, unless otherwise stated. Furthermore, the terms " . . . unit," " . . . unit," "module," "device," or the like described in the specification refers to a unit that processes at least one function or operation, which is implemented by a combination of hardware and/or software.

Throughout the specification, the term "and/or" should be understood to include all possible combinations presented from one or more related items. For example, the term "first, second and/or third items" refers to all possible combinations presented from two or more of the first, second, or third item as well as the first, second, and third items.

Embodiments of the present invention will be described below with reference to the accompanying drawings.

Figure 1:
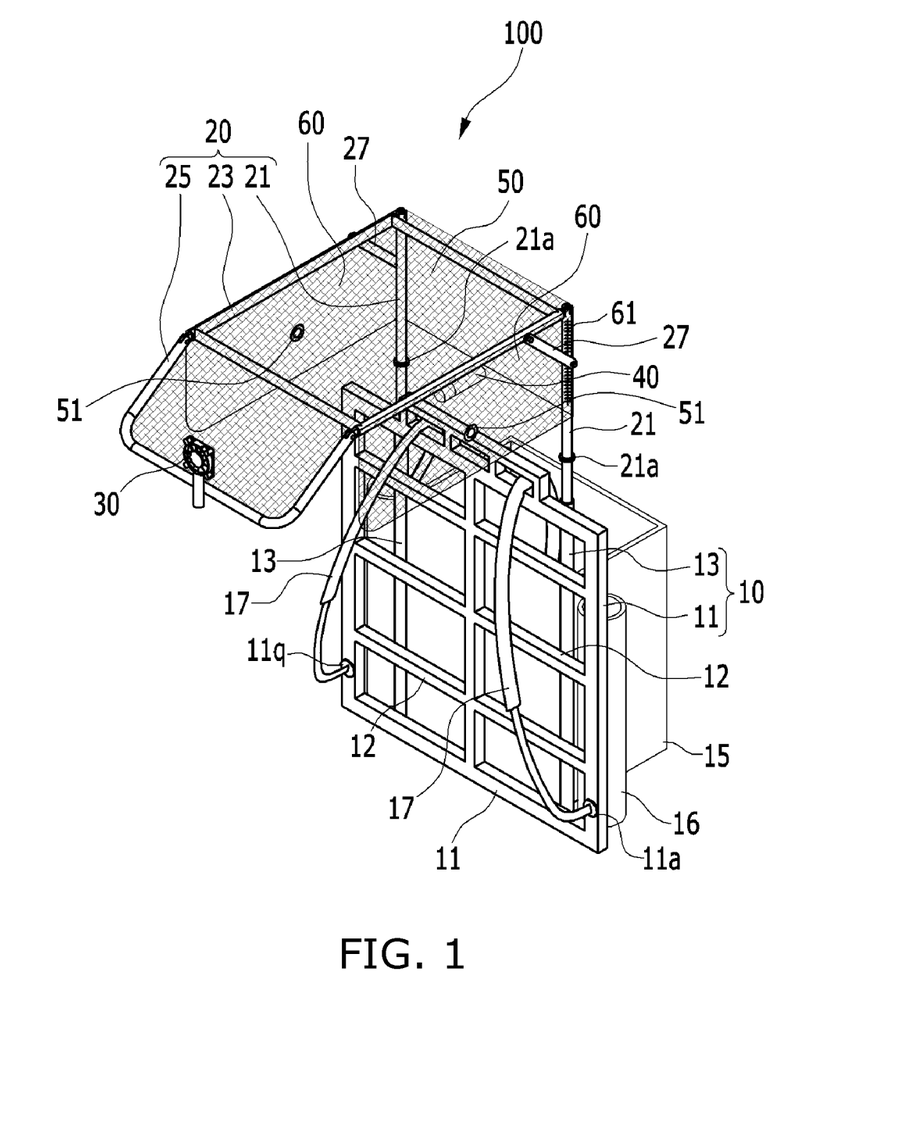
FIG. 1 is a perspective view schematically showing a combined shade and backpack according to a first embodiment of the present invention.
Figure 2:
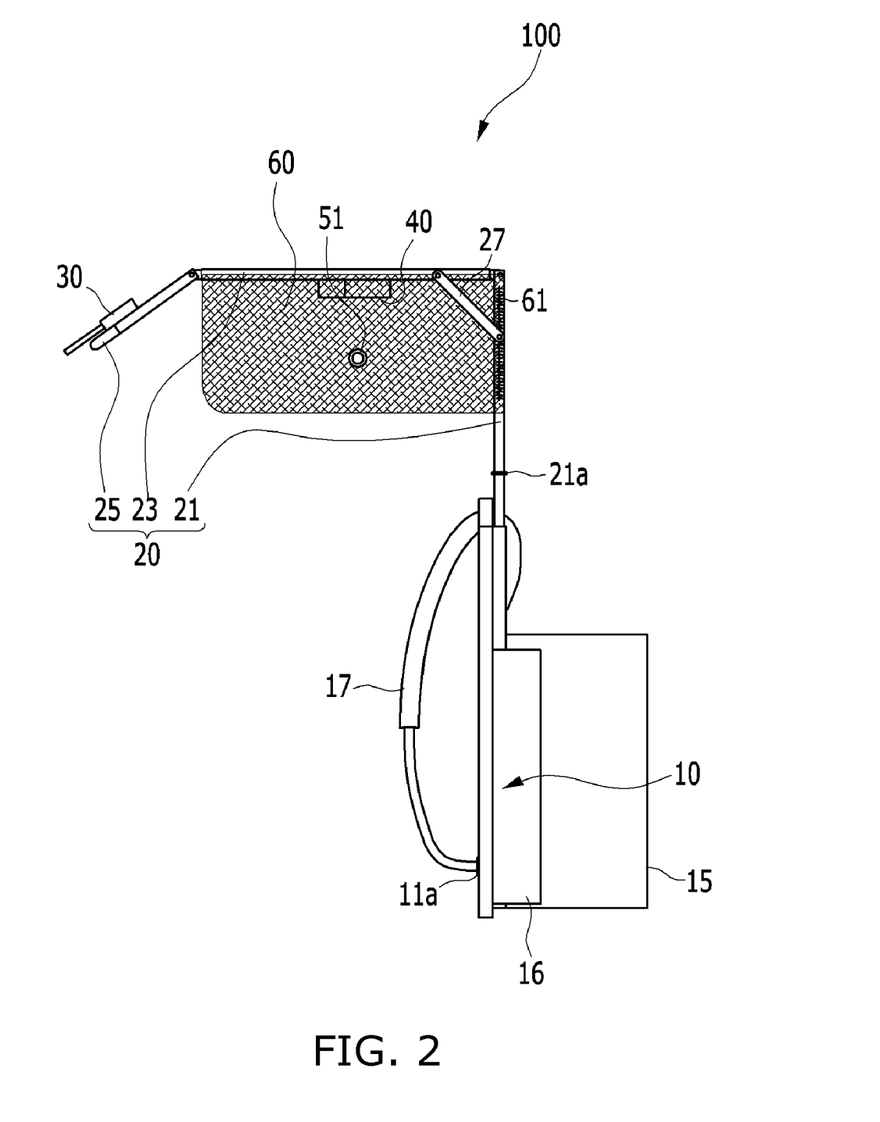
FIG. 2 is a side view schematically showing the combined shade and backpack of FIG. 1.
Figure 3:
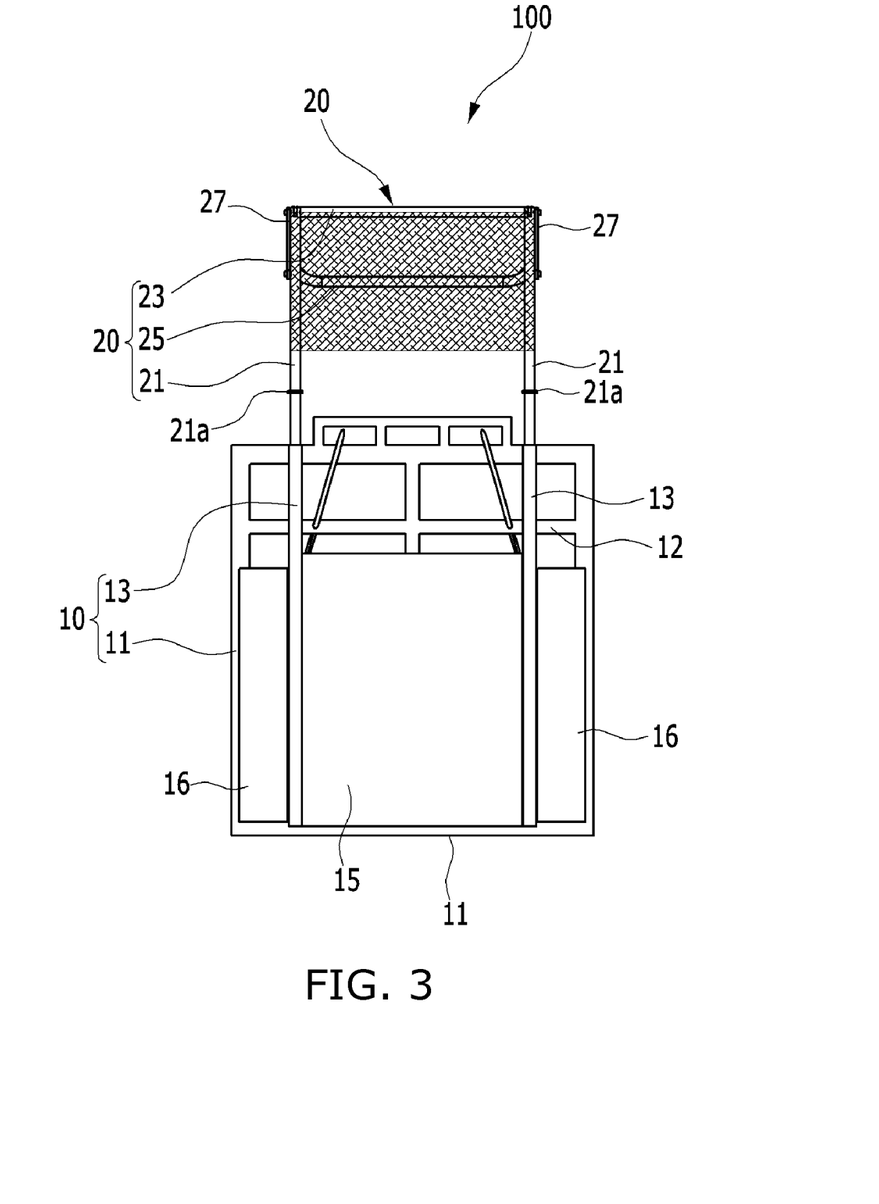
FIG. 3 is a back view schematically showing the combined shade and backpack of FIG. 1.
Figure 4:
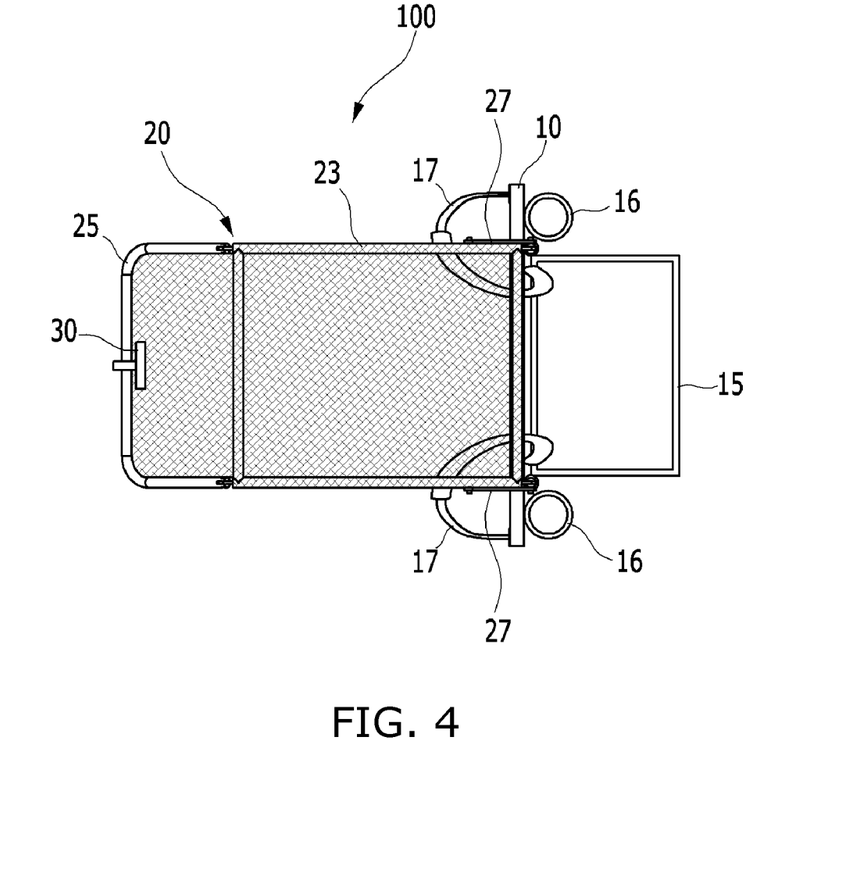
FIG. 4 is a plan view schematically showing the combined shade and backpack.

FIG. 1 is a perspective view schematically showing a combined shade and backpack according to a first embodiment of the present invention, FIG. 2 is a side view schematically showing the combined shade and backpack of FIG. 1, FIG. 3 is a back view schematically showing the combined shade and backpack of FIG. 1, and FIG. 4 is a plan view schematically showing the combined shade and backpack.

As shown in FIGS. 1 to 4, a combined shade and backpack 100 according to an embodiment of the present invention includes: a backpack frame 10 configured to come into contact with and be supported on the back part of a user, and adapted such that an accommodation part 15 is fastened thereto; a fixed frame 21 detachably disposed on the upper side of the backpack frame 10; a folding frame 23 foldably disposed on the fixed frame 21; a shade frame 25 disposed to be inclined to the folding frame 23; stopper members 27 configured to fix the rotated state of the folding frame 23; a shade cover 50 configured to cover spaces among the fixed frame 21, the folding frame 23, and the shade frame 25; and a rotating fan 30 disposed on the shape frame ( ), and configured to provide forced air blowing to the head part of the user.

The backpack frame 10 is supported in contact with the back part of the user, and may be formed to have a broad area so that it can be stably supported on the overall back part of the user. This backpack frame 10 is composed of a combination of a plurality of frames, and may be disposed such that it can be stably supported on the overall back part of the user.

In other words, the backpack frame 10 may be formed in the state in which a plurality of frames are combined and connected such that it can be stably supported between the shoulder and the waist on the overall back part of the user.

More specifically, the backpack frame 10 may include: a frame body 11 configured to be supported on the back part of the user; and reception parts 13 disposed on the frame body 11, and configured to detachably receive the fixed frame 21 to be described later.

The frame body 11 is composed of a rectangular frame that comes into direct contact with and is supported on the back part of the user, and may be disposed in the state in which a plurality of frames are connected to each other.

The frame body 11 has fastening portions 11a to which backpack straps 17 are connected. The fastening portions 11a may be formed as fastening holes formed in the frame body 11 and configured such that ends of the backpack straps 17 are inserted and fastened thereinto, or may be formed as catch protrusions (not shown) configured such that ends of the backpack straps 17 are caught and fastened thereinto. Although the frame body 11 is described as being made of an engineering plastic material in order to improve durability as an example, it is not limited thereto, but it may be possible to appropriately change the engineering plastic material to a predetermined material having the same or similar strength and apply the predetermined material.

A support frame 12 configured such that members are connected to each other in a lattice shape in order to cross and support the back part of the user may be connected to the frame body 11. It will be apparent that the support frame 12 is not necessarily connected to the frame body 11, but it may be possible to appropriately change the support frame 12 to a predetermined support plate (not shown) or a predetermined support cover (not shown) made of a fabric material that comes into surface contact with the back part of the user.

Meanwhile, the accommodation part 15 configured to accommodate items may be detachably fastened to the frame body 11.

The accommodation part 15 is fabricated in a basket form, and may be detachably fastened to the frame body 11 by a predetermined fastening member. It will be apparent that the accommodation part 15 is not necessarily limited to the basket form but may be appropriately fabricated in a backpack form made of a fabric material.

Furthermore, auxiliary accommodation parts 16 may be detachably fastened to the frame body 11.

The auxiliary accommodation parts 16 are detachably fastened to the edge locations of the frame body 11 by predetermined fastening members, such as Velcro members or the like. In the present embodiment, a case where the auxiliary accommodation parts 16 are attached to accommodate cylindrical water bottles or the like is described as an example. However, the auxiliary accommodation parts 16 are not necessarily limited to the accommodation of water bottles, but may appropriately accommodate predetermined articles having a predetermined size or smaller that can be conveniently accommodated by the user.

Meanwhile, the reception parts 13 may be formed on the upper side of the frame body 11.

The reception parts 13 includes a pair of reception parts formed on the upper side of the frame body 11, and may be formed such that parts of the fixed frame 21 to be described later are inserted thereinto.

The reception parts 13 may be formed inside the frame body 11, or may be formed in reception tube shapes and separately fastened to the frame body 11.

The reception parts 13 are formed on the upper side of the frame body 11 in the state in which two reception parts are spaced apart from each other. The parts of the fixed frame 21 of a shade body part 20 to be described later may be detachably fastened into the reception parts 13.

The shade body part 20 may include: the fixed frame 21 detachably disposed on the upper side of the backpack frame 10; the folding frame 23 foldably disposed on the fixed frame 21; and the shade frame 25 disposed to be inclined to the folding frame 23.

The fixed frame 21 protrudes in the lower portion of the shade body part 20, and may be fastened to the reception parts 13 in the state in which parts thereof are fastened to the reception parts 13. Stopper protrusions 21a configured to limit the length to which the reception parts 13 are inserted protrude from the side surfaces of the fixed frame 21.

The folding frame 23 may be rotatably connected to the fixed frame 21.

The folding frame 23 is rotatably connected to the fixed frame 21, and may be disposed to be rotatable in the forward direction of the user. In other words, the folding frame 23 may be selectively rotatably in the forward direction of the fixed frame 21 in response to the selection of the user when the shading of sunlight is required.

The state in which the folding frame 23 has been rotated with respect to the fixed frame 21 may be fixed by the stopper members 27.

In other words, the first sides of the stopper members 27 are detachably attached to the folding frame 23, and the second sides thereof are detachably fastened to the fixed frame 21. The stopper members 27 may fasten the state in which the folding frame 23 has been rotated.

For this purpose, fastening protrusions may protrude from the side surfaces of the folding frame 23 and the fixed frame 21, respectively.

In other words, the stopper members 27 are formed as fastening pieces in which fastening holes into which the fastening protrusions are inserted and fastened are formed in both sides, and may be inclined and connected between the folding frame 23 and the fixed frame 21 and fix the rotated state of the folding frame 23.

Meanwhile, the shade frame 25 may be disposed to be inclined to the folding frame 23.

The shade frame 25 is disposed to be inclined to an end of the folding frame 23, and may be disposed in the state in which the inclined angle thereof is adjusted in response to the selection of the user.

The shade frame 25 may be disposed to be inclined to the end of the folding frame 23 by a hinge having predetermined pressing force, and may be disposed to be appropriately inclined at a predetermined rotated angle.

In the present embodiment, a case where the shade frame 25 is disposed to be inclined to the folding frame 23 at an angle of 30 degrees will be described as an example.

As described above, the reason that the shade frame 25 is disposed to be inclined to the folding frame 23 is to enable the air blowing of the rotating fan 30 to be smoothly performed in the direction of the face of the user while the shading of sunlight is being performed more smoothly.

In other words, the rotating fan 30 configured to provide forced air blowing to the head part of the user may be disposed in the protruding end of the shade frame 25. In the state in which the shade frame 25 has been rotated to be inclined to the folding frame 23, the rotating fan 30 may be operated and provide forced air blowing in the direction of the head of the user.

In the present embodiment, a case where the rotating fan 30 is applied as a hand fan in which a grip portion protrudes will be described as an example. In the following, the same reference numeral is assigned to the rotating fan and the hand fan.

The hand fan 30 may be detachably disposed in the shade frame 25. In other words, a predetermined clamping device is disposed in the shade frame 25. The hand fan 30 may be appropriately fastened to the location of the protruding end of the shade frame 25.

Additionally, a USB terminal configured to be connected to a battery member 40 to be described later and to supply power to the hand fan may be disposed in the shade frame 25.

The hand fan is disposed as described above. In a high-temperature climate state, such as summer or the like, both the effective shading of sunlight and the forced air blowing of the fan may be provided to the head part of the user, and thus the degree of satisfaction of the user may be improved due to comfortable use.

Meanwhile, the shade cover 50 for the shading of sunlight may be attached.

The shade cover 50 may be fastened to cover the spaces among the fixed frame 21, the folding frame 23, and the shade frame 25. The shade cover 50 is made of a material capable of water proofing and the blocking of ultraviolet rays, and may appropriately block ultraviolet rays and rainwater in the direction of the head of the user.

In other words, the shade cover 50 is detachably fastened to overall or part of the fixed frame 21, the folding frame 23, and the shade frame 25. In the state in which the combined shade and backpack 100 of the present embodiment is worn, the effect shading of sunlight and the partial blocking of rainwater are enabled. A case where the shade cover 50 is formed in a mesh form made of a polyethylene material will be described as an example.

Meanwhile, extension covers 60 may extend from the locations of both side surfaces of the folding frame 23. The extension covers 60 extend in the directions of the rotated both side surfaces of the folding frame 23, and may be formed to block sunlight radiated in the direction of the head of the user.

In other words, the extension covers 60 may be detachably fastened to the shade cover 50, attached to the fixed frame 21, by the fastening members 61 in the state of being connected to the locations of the edges of the side surfaces of the folding frame 23 and being curved in the directions of both sides of the face of the user. These extension covers 60 are made of the same material as the shade cover 50, and thus the action of blocking sunlight and rainwater may be smoothly performed.

The fastening members 61 may be applied as zippers configured to fasten the extension covers 60 and the shade cover 50, attached to the fixed frame 21, to each other. In the following description, the same reference numeral is assigned to the fastening members and the zippers.

As described above, the zippers 61 may be provided to fasten the extension covers 60 and the shade cover 50 to each other in the state in which the shade body part 20 is in use and to separate the extension covers 60 and the shade cover 50 from each other in the state in which the shade body part 20 is not in use.

Meanwhile, the battery member 40 configured to supply power to the rotating fan 30 may be disposed on the shade frame 25.

The battery member 40 may be fastened to the folding frame 23, and may easily supply driving power to the rotating fan 30.

A case where the battery member 40 is disposed in the state of being chargeable and dischargeable will be described as an example. A case where the battery member 40 is charged by predetermined power supply in the state in which the combined shade and backpack 100 of the present embodiment is not in use will be described as an example.

However, it may be possible to appropriately change the above case to a case where the battery member 40 is charged by power supply performed by a predetermined solar panel disposed on the shade body part or backpack frame 10 and apply the latter case. Furthermore, it may be possible to appropriately change the battery member 40 from a rechargeable type to a replaceable, disposable type and apply the replaceable, disposable type.

In the state in which the combined shade and backpack 100 is not in use, the folding frame 23 and the shade frame 25 may be folded to the fixed frame 21.

In this case, a snap fastener 51 is attached to the shade cover 50. In the state in which the shade body part 20 is folded, the folded state is stably fixed by the folded snap fastener 51. It will be apparent that the folded state of the shade body part 20 is not necessarily fixed by the snap fastener 51, but it may be possible to appropriately change this case to a case where the folded state is fixed by Velcro members (not shown) and apply the latter case.

As described above, in the present embodiment, the shade body part 20 is rotated in the location of the head of the user in the state in which the backpack is in use, thereby enabling the shading of sunlight to be performed. Additionally, cooling air may be supplied to the head part of the user by the operation of the rotating fan, thereby enabling the degree of satisfaction of the user to be improved due to comfortable use.

Figure 5:
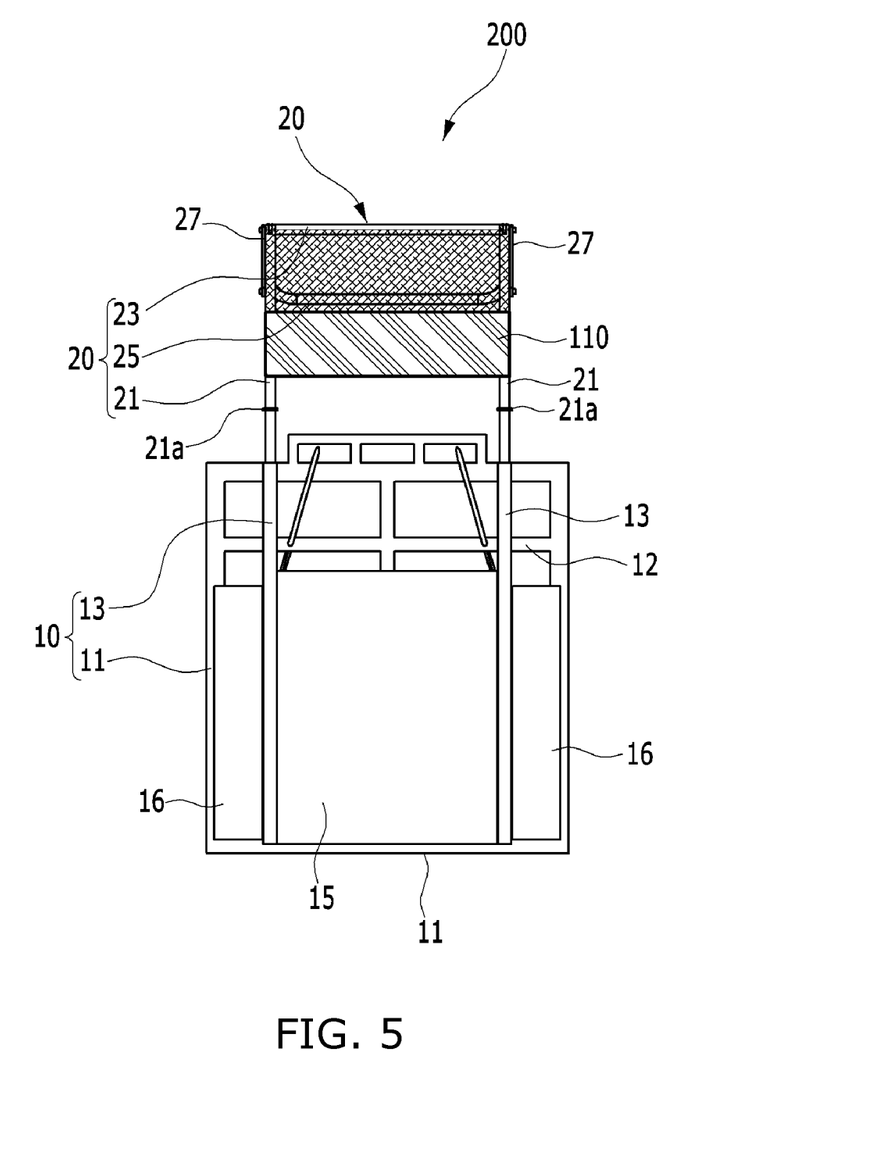
FIG. 5 is a back view schematically showing a combined shade and backpack according to a second embodiment of the present invention.

FIG. 5 is a back view schematically showing a combined shade and backpack according to a second embodiment of the present invention. The same reference numerals used in FIGS. 1 to 4 designate the same or similar members having the same or similar functions. In the following description, detailed descriptions of the same reference numerals will be omitted.

As shown in FIG. 5, a solar panel 110 configured to charge the battery member 40 may be disposed in the shade body part 20 of the combined shade and backpack 200 according to the second embodiment of the present invention.

The solar panel 110 is disposed at the location of the fixed frame 21 of the shade body part 20. The battery member 40 is charged without the separate supply of power, and thus the rotating fan 30 may be stably operated.

Figure 6:
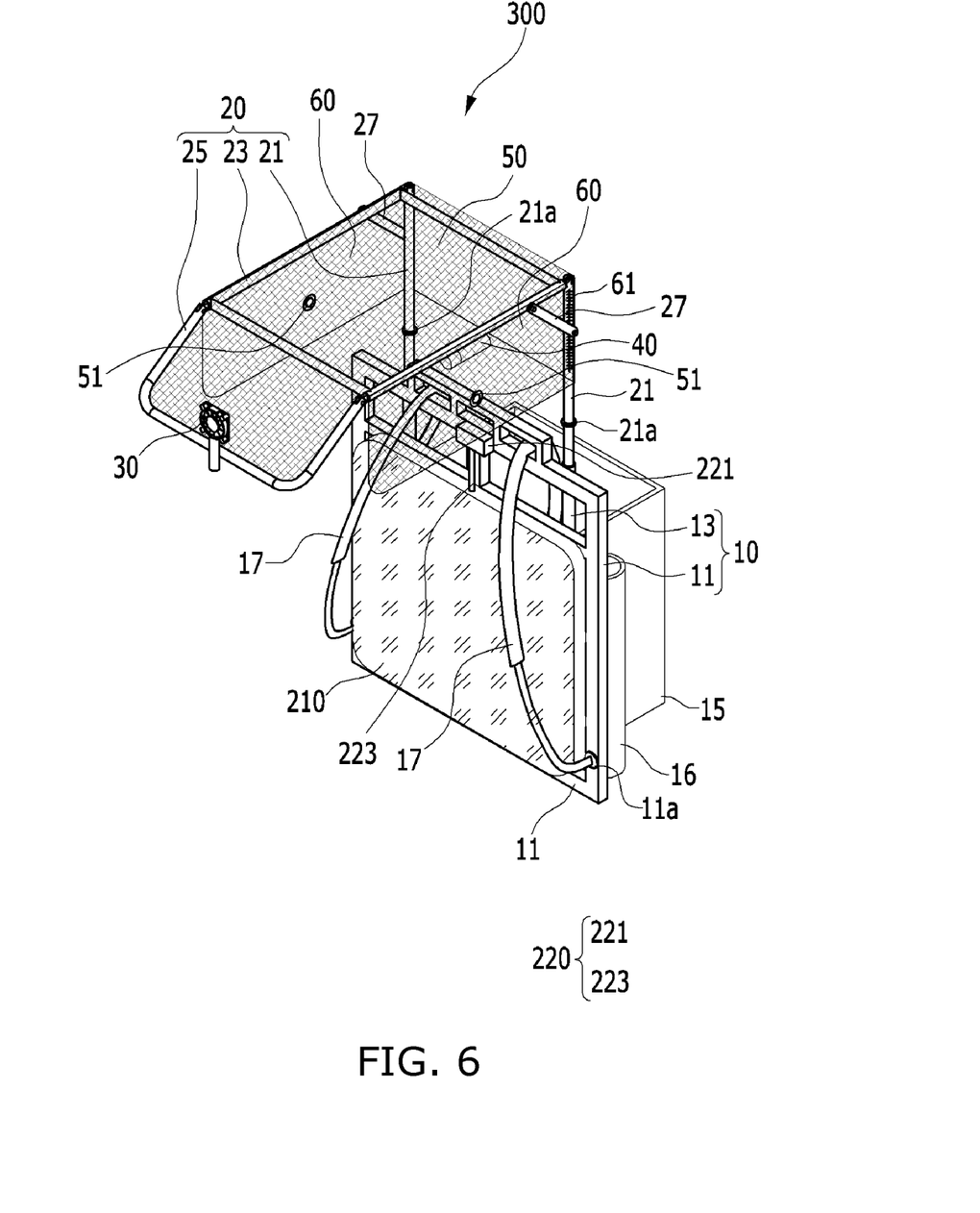
FIG. 6 is a perspective view schematically showing a combined shade and backpack according to a third embodiment of the present invention.

FIG. 6 is a perspective view schematically showing a combined shade and backpack according to a third embodiment of the present invention. The same reference numerals used in FIGS. 1 to 5 designate the same or similar members having the same or similar functions. In the following description, detailed descriptions of the same reference numerals will be omitted.

As shown in FIG. 6, a heating pad 210 may be attached to a side surface, which comes into contact with and supported on the back part of a user, on the backpack frame 10 of the combined shade and backpack 300 according to the third embodiment of the present invention.

The heating pad 210 is formed in an electric blanket form configured to generate heat in response to the supply of power, and is attached to the backpack frame 10. In a low-temperature climate environment, appropriate body temperature may be maintained by the heating of the back part.

The heating pad 210 may be supplied with power through a power supply unit 220 fastened to the backpack frame 10.

The power supply unit 220 may include a battery 221 fastened to the backpack frame 10 and a connector member 223 configured to connect the battery 221 and the heating pad 210 to each other.

The battery 221 may be applied as a rechargeable battery, and may be repeatedly used. The connector member 223 may be applied as a USB connector configured to connect the battery 221 and the heating pad 210 to each other.

Although the preferred embodiments of the present invention have been described above, the present invention is not limited thereto. It will be apparent that various modifications may be made within the range of the claims, the detailed description of the invention and the accompanying drawings and fall within the scope of the present invention.

The invention claimed is:

1. A combined shade and backpack comprising:
    a backpack frame configured to come into contact with and be supported on a back part of a user, and adapted such that an accommodation part is fastened thereto;
    a shade body part including a fixed frame detachably disposed on an upper side of the backpack frame, a folding frame foldably disposed on the fixed frame, and a shade frame disposed to be inclined to the folding frame;
    stopper members configured to fix a rotated state of the folding frame;
    a shade cover configured to cover spaces among the fixed frame, the folding frame, and the shade frame; and
    a rotating fan disposed on the shade frame, and configured to provide forced air blowing to a head part of the user.

2. The combined shade and backpack of claim 1, wherein the backpack frame comprises:
    a frame body configured to be supported on the back part of the user; and
    reception parts disposed on the frame body, and configured to detachably receive the fixed frame.

3. The combined shade and backpack of claim 1, further comprising a battery member disposed on the folding frame and configured to provide rotation driving force to the rotating fan.

4. The combined shade and backpack of claim 1, further comprising auxiliary accommodation parts configured to be detachably attached to the backpack frame.

5. The combined shade and backpack of claim 1, wherein:
    fastening protrusions protrude from side surfaces of the fixed frame and the folding frame, respectively; and
    the stopper members are fastening pieces in which fastening holes configured to receive the fastening protrusions are formed in both sides of the fastening pieces in a state in which the folding frame is rotated to the fixed frame.

6. The combined shade and backpack of claim 1, wherein:
    extension covers configured to extend to side surfaces of the shade cover are formed on side surfaces of the folding frame; and
    first sides of edges of the extension covers are detachably fastened to the shade cover attached to the fixed frame by fastening members.

7. The combined shade and backpack of claim 1, further comprising:
    a heating pad configured to be attached to a side surface of the backpack frame that comes into contact with and supported on a back part of the user and to generate heat in response to the supply of power; and
    a power supply unit configured to be fastened to the backpack frame and to supply driving power to the heating pad.

* * * * *